June 3, 1930.  E. E. HANS  1,761,914
INSTRUMENT PANEL
Filed Jan. 24, 1929

Inventor
Edmund E. Hans
By Blackwell, Spencer & Flick
Attorneys

Patented June 3, 1930

1,761,914

UNITED STATES PATENT OFFICE

EDMUND E. HANS, OF DETROIT, MICHIGAN, ASSIGNOR TO A C SPARK PLUG COMPANY, OF FLINT, MICHIGAN, A COMPANY OF MICHIGAN

INSTRUMENT PANEL

Application filed January 24, 1929. Serial No. 334,780.

This invention relates to recording or measuring instruments or recording devices and has particular reference to the housing for enclosing the recording or measuring mechanism. The invention is designed or intended to be especially adaptable for application to the instrument boards of automotive vehicles.

It is an object of the invention to provide a housing which is readily separable and which has a base plate which may be removed to allow a ready adjustment of the instruments contained therein. The housing has no portion thereof which is directly secured to any other portion but is assembled and then secured to the instrument board by means of the usual bracket customarily used for attaching instrument casings to hold them in position. This assembly without securing the parts in fixed relation makes a very readily adjustable instrument and one which is extremely easy to assemble, has parts which are readily replaceable and therefore greatly cheapens the construction.

The object of the invention is accomplished by providing a base plate which is preferably provided with an annular narrow flange at its outer edge. Inside this edge there is adapted to interfit or slip the edge of the conformably shaped or mating side flange of a casing. The face of the casing is provided with suitable openings to render the dials visible and over the casing face and openings there is provided a facing plate having flanges which enter the dial openings of the casing. The casing face is provided with suitably bent portions or tongues the ends of which extend slightly above the plane of the casing and serve as a resilient means for mounting the facing plate. Over the facing plate there is positioned the usual transparency in the form of a glass held spaced from the facing plate by means of a bead or a plurality of projections pressed therein. The facing plate is further provided with suitable tongues at its edges, the purpose of which is to properly position the glass or transparency on the housing. A bezel has a flange fitting over the outer portion of the casing and a bead extending over the glass edge and in this bead there is placed a suitable fabric packing to resiliently hold the glass on the casing plate.

Any suitable number of gauges or recording instruments may be provided in the housing. In the present invention two have been shown, although three or more may be used as desired.

One side of the housing is preferably provided with an opening over which a transparent shell is mounted in order that the dials inside the housing may be illuminated.

On the drawing,

Fig. 5 is a detailed view of the resilient mounting for facing plate.

Figure 1:
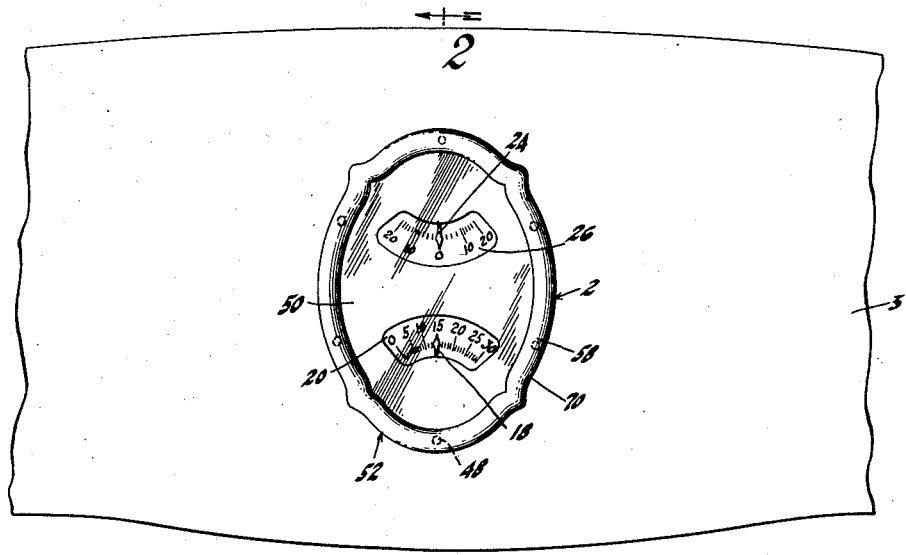
Fig. 1 is an elevational view of the housing showing the invention applied to the instrument board of an automobile.

Referring to the drawing the numeral 2 indicates the housing or inclosure as a whole mounted in an instrument board 3. A base plate 4 forms the back of the housing and this base plate is provided with the narrow annular flange 6 at its outer edge.

On the base plate there are mounted the recording instruments 8 and 10 in this instance shown as a Bourdon tube oil pressure gage and an ammeter respectively. The Bourdon tube gage 8 is mounted by means of the usual socket 12 which extends through the base plate and has the Bourdon tube 14 secured therein. A suitable mechanism 16 is connected to the Bourdon tube and this mechanism swings the pointer 18 over the dial 20.

The ammeter 10 is likewise provided with the suitable mechanism 22 which moves the pointer 24 over its dial 26. A terminal bolt 28 suitably insulated from the base plate as at 30 is adapted to hold the ammeter in place.

A casing 32 is provided with an annular peripheral flange 34 which is adapted to fit inside of the flange 6 of the base plate 4. While this interfitting relation as described is preferred, nevertheless the flange 6 might be omitted and the flange 34 rest in a rabbet or stepped portion at the edge of the plate 4. The face 36 of the casing 32 is provided with dial openings 38 over the ends of the pointers 18 and 24 to render the dials 20 and 26 visible.

A facing plate 40 is provided over the face 36 of the casing 32 and has openings corresponding to the dial openings 38 and at these openings is provided with flanges 42 which fit closely in the dial openings. The facing plate 40 is resiliently held on the face 36 of the casing by means of the pressed-out fingers or projections 44, two of which are shown, but any suitable number may be provided. These fingers normally have their ends extending slightly above the outer plane of the casing face 36, as shown in Fig. 5, in order to resiliently press against the facing plate 40.

The facing plate 40 is provided with integral lateral upwardly extending edge tongues or fingers 46 and the knobs or projections 48, the purpose of which is to position the glass or transparency 50 relative to the facing plate, and to space the transparency from the facing plate, respectively. Instead of the projections or knobs 48, a single bead or projection may be pressed from the facing plate 40.

A bezel 52 has a flat portion 54 resting on the face 36 of the casing 32, an annular edge flange 56 which fits rather tightly over the flange 34, and a bead 58 which projects over the edge of the glass or transparency 50. This bead is filled with a suitable packing or fabric 60 which serves to resiliently hold the glass on the facing plate 40.

Figure 2:
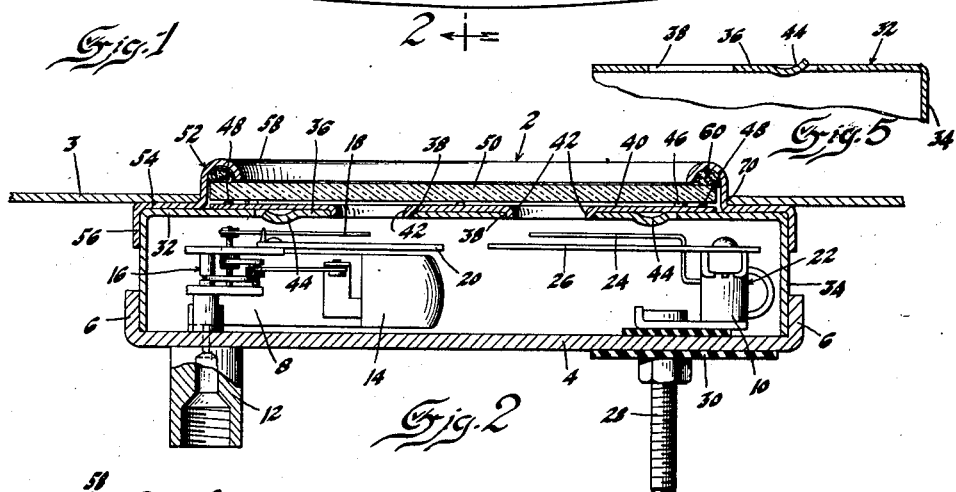
Fig. 2 is a longitudinal section through the casing on a line 2—2 of Fig. 1, a view being turned through 90°.

In connection with the structure so far described, it is to be observed that there is no definite permanent inter-connection between any of the parts forming the housing. For instance the flange 34 has a slip fit with the flange 6 and the facing plate 40 rests upon the face 36 with but the tightness of the flanges 42 in the openings 38 to hold it in place, while the bezel 52 is held in place merely by the tightness of the fit between the flanges 34 and 56. It is therefore to be seen that with the structure as shown assembled in Fig. 2 all of the housing parts may be easily and readily removed.

Figures 3, 4:
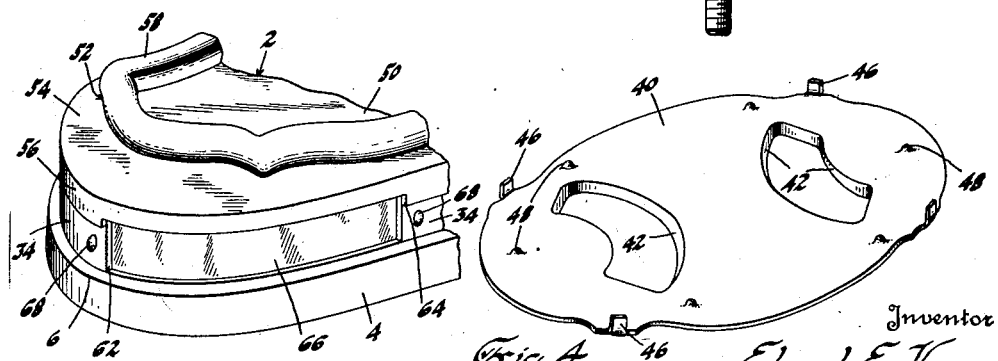
Fig. 3 is a perspective view of a portion of the casing showing the transparent shell permitting the illumination of the dials in the housing.
Fig. 4 is a detailed perspective view of the facing plate.

Referring to Fig. 3 it will be seen that a portion of the flange 34 of the casing 32 as well as a portion of the flange 56 of the bezel 54 are provided with cut out portions indicated at 62 and 64 respectively. Inside the housing and over the opening formed by these cut-out portions there is applied the transparency 66 of any suitable material. This transparency is secured at its ends by means of the rivets or other securing means indicated at 68. The purpose of this construction is to provide a means for allowing the light from a suitable source of illumination to fall on the dials 20 and 26 so that the position of the pointers 18 and 24 may be readily seen through the openings 38.

As a result of the invention it will be noted that all of the instruments (which are rigidly mounted on the back plate) are readily accessible for adjustment by the withdrawal of the back plate from the casing or the removal of the casing away from the plate. This adjustment is permitted due to the narrow flange 6. It will be noted that the Bourdon tube gage is rigidly and permanently secured to the back plate which necessitates a new set of instruments and back plate in case the Bourdon tube is damaged beyond repair. The construction is nevertheless cheaper and it is therefore to be preferred for the reason that it removes all the individual back or base plates for each instrument.

In order to secure the housing in place on an instrument board, the board is provided with a suitable opening 70 adapted to conform to the shape of the bead 58 of the bezel. The flat portion 54 then fits against the back of the instrument board and a suitable bracket having its end secured to the instrument board and its central portion passing over the back of the housing secures the housing and instruments in place. Any suitable means may be used between the bracket and housing so as to permit a ready removal of the housing as a whole.

I claim:

1. In a housing for recording devices, a back plate, a casing interfitting with but not secured to said plate, dial openings in said casing, a facing plate over said casing, means for resiliently supporting said plate on said casing, a transparent member over said plate, and a bezel on said casing to hold said transparent member in place.

2. In a housing for recording devices, a back plate, a casing interfitting with said plate and provided with dial openings, a facing plate over said casing said facing plate provided with openings corresponding to the casing openings, means on the casing to resiliently support said facing plate, a transparency over the facing plate, and a bezel for holding said transparency in position.

3. In a housing for recording devices, a back plate, a casing interfitting with said plate, said casing having a plurality of dial openings, a facing plate over said casing having openings corresponding to said dial openings, and flanges at the facing plate openings projecting into the casing openings.

4. In a housing for recording devices, a back plate having an annular flange, a casing interfitting with said flange, said casing having dial openings, a facing plate over said casing having corresponding openings, flanges at said facing plate openings fitting over said dial openings, means to resiliently support said facing plate on said casing, a transparency over said facing plate, and a bezel for holding said transparency to said casing.

5. In a housing for recording devices, a back plate having an annular flange, a casing interfitting with said flange, said casing having dial openings, a facing plate over said casing having corresponding openings, means on said casing to resiliently support said facing plate, flanges on said facing plate projecting into said dial openings, a transparency over said facing plate, and a bezel to hold said transparency on said casing.

6. In a housing for recording devices, a back plate, a casing interfitting with but not secured to said plate, said casing having dial openings, a facing plate over said casing having corresponding openings, a transparency mounted over said facing plate in spaced relation therewith, and a bezel to hold said transparency over said casing.

7. In a housing for recording devices, a back plate, a casing interfitting with but not secured to said plate, said casing having dial openings, a facing plate over said casing having corresponding openings, a transparency over said facing plate, means formed on said facing plate to space said transparency therefrom, and a bezel to hold said transparency on said casing.

8. In a housing for recording devices, a back plate, a casing interfitting with but not secured to said plate, said casing having a plurality of dial openings, a facing plate over said casing having openings corresponding to said dial openings, a transparency over said facing plate, a bead pressed from said facing plate to space said transparency therefrom and a bezel to hold said transparency on said casing.

9. In a housing for recording devices, a back plate, a casing interfitting with said plate, said casing having dial openings, a facing plate over said casing having corresponding openings, a transparency over said facing plate, means on said plate for spacing the transparency therefrom and for positioning it relative thereto, and a bezel for holding said transparency on said casing.

10. In a housing for recording instruments, a back plate, a casing interfitting with said back plate, said casing having a plurality of dial openings, a facing plate over said casing having corresponding openings, a transparency over said facing plate and spaced therefrom by pressed out parts of said facing plate, a bezel having a beaded portion projecting over said transparency, and a resilient material in said bead to resiliently hold said transparency on said casing.

11. In a housing for recording instruments, a back plate, a narrow annular flange on said plate, a casing fitting in but not secured to said flange, said casing having a plurality of dial openings, a facing plate over said casing having corresponding openings, flanges on said facing plate openings fitting in said dial openings, a plurality of integral fingers pressed from said casing to resiliently mount said facing plate, a transparency over said facing plate, said facing plate having projecting knobs or beads to space said transparency therefrom and also having integral fingers to position said transparency relative thereto, a bezel over said casing, a bead on said bezel projecting over said transparency, and a resilient material in said bead to resiliently hold said transparency on said casing.

12. In a housing for recording instruments, said housing including a casing and a bezel thereover, adjacent cut-out portions in said casing and bezel, and a transparency over said cut-out portions to permit illumination of the interior of the housing.

In testimony whereof I affix my signature.

EDMUND E. HANS.